Nov. 7, 1950
S. H. BERCH
2,528,680
MECHANISM FOR FILLING, VACUUMIZING, AND SEALING CONTAINERS
Filed Aug. 7, 1944
4 Sheets-Sheet 1
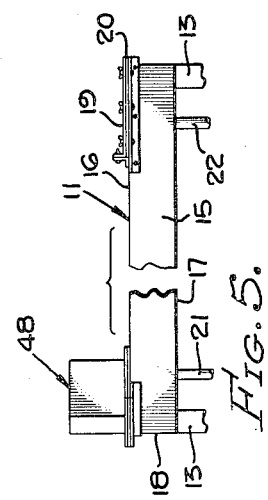
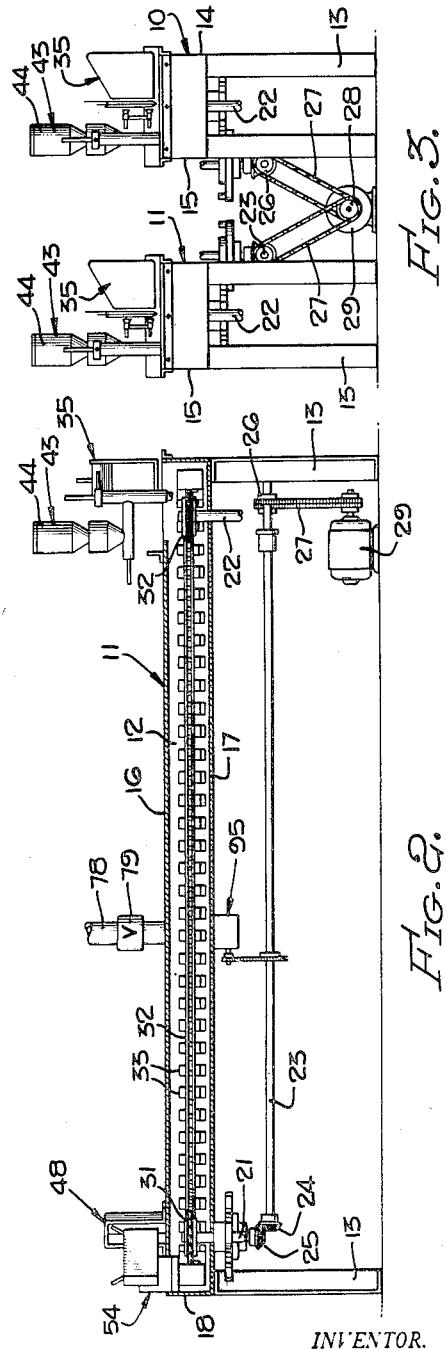
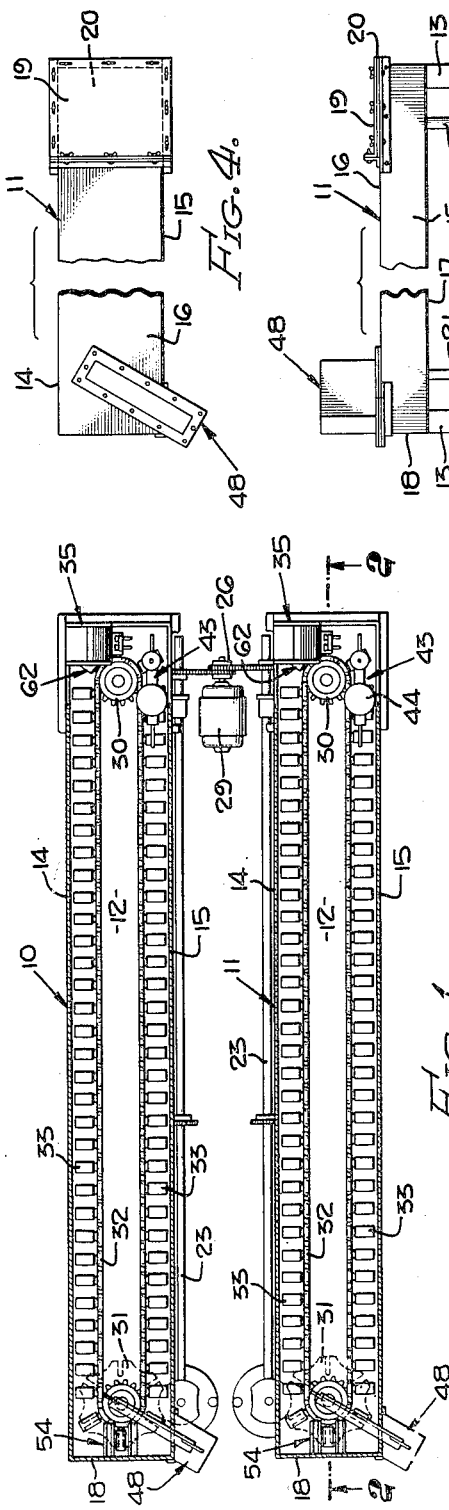
INVENTOR.
SAMUEL H. BERCH
BY
ATTORNEY

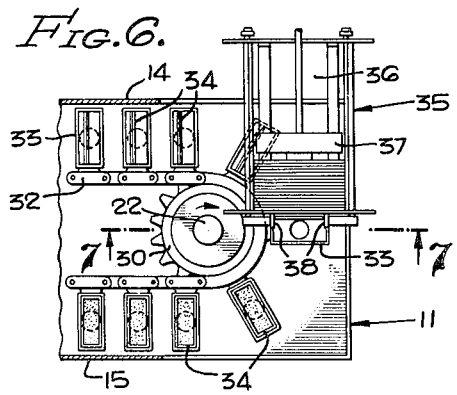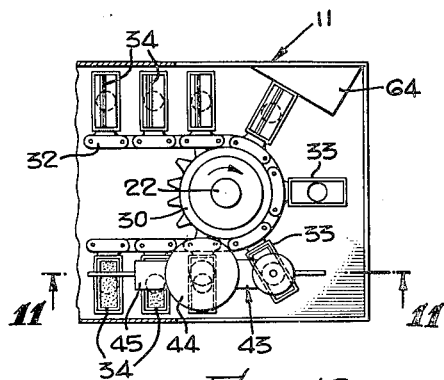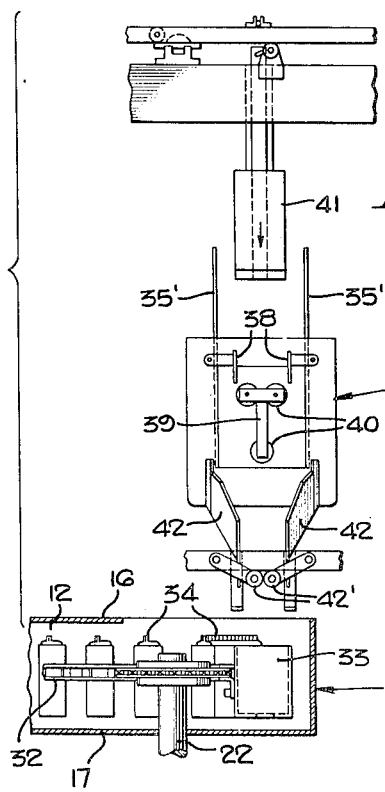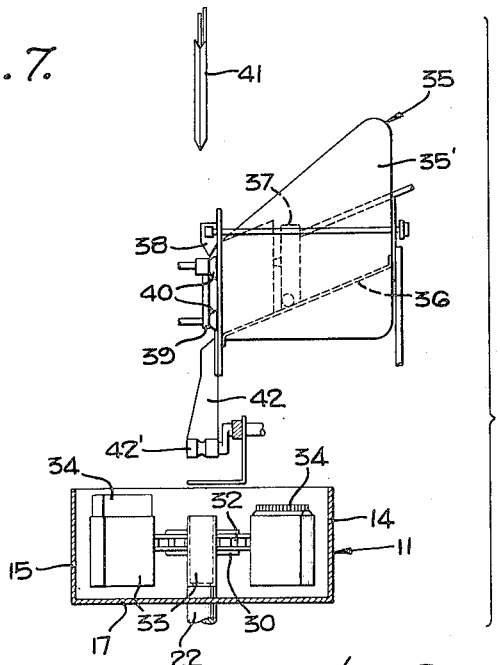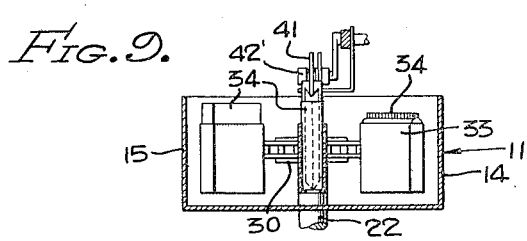

Nov. 7, 1950

S. H. BERCH 2,528,680

MECHANISM FOR FILLING, VACUUMIZING, AND SEALING CONTAINERS

Filed Aug. 7, 1944

INVENTOR.
SAMUEL H. BERCH
BY
ATTORNEY

Nov. 7, 1950 S. H. BERCH 2,528,680
MECHANISM FOR FILLING, VACUUMIZING, AND SEALING CONTAINERS
Filed Aug. 7, 1944 4 Sheets-Sheet 4

INVENTOR.
SAMUEL H. BERCH
BY
ATTORNEY

Patented Nov. 7, 1950

2,528,680

UNITED STATES PATENT OFFICE 2,528,680

MECHANISM FOR FILLING, VACUUMIZING, AND SEALING CONTAINERS

Samuel H. Berch, Beverly Hills, Calif., assignor to The Flexible Vacuum Container Corporation, Los Angeles, Calif., a corporation of Nevada Application August 7, 1944, Serial No. 548,465

2 Claims. (Cl. 226—51)

This invention relates to a mechanism for filling, vacuumizing and sealing container.

Heretofore material has been sealed within paper containers so that it could be transported and dispensed, the seal merely acting temporarily to hermetically close the container while the pressure of air on the inside of the container and on the outside remained at normal atmospheric pressure. Containers of this type have been used in an attempt to package products unstable in character and which may be gas-forming or may deteriorate due to oxidation brought about by the air entrapped within the container when hermetically sealed. This is particularly true in the packaging of whole milk powder. In such a case it will be recognized that when the milk has been dehydrated there will be a high concentration of butter-fat in the dried product, and that this material is susceptible to rapid oxidization, whereby the product will become rancid and will not be suitable for human consumption. It is also known that conditions of high humidity or high temperature will tend to cause spoilage of products, such as powdered milk, when only sealed hermetically in a container. In vacuum packaging machines heretofore devised it has been common practice to subject the packages individually to suction, during which time the packages were sealed. In view of the fact that an interval of time must elapse during the vacuumizing period to insure that the air would be properly withdrawn from the package and from the voids within and around the particles of the product, it will be recognized that a machine cannot operate at a desirable high speed. The speed of operation is also retarded when products such as powdered milk are vacuumized, since air is entrapped within the powdered milk particles, and this must be withdrawn in order to prevent the milk powder from deteriorating. Furthermore, there is a tendency for the powdered product to become compacted so that the air is not uniformly and completely withdrawn from the product within the container. It is desirable therefore to provide a light flexible bag-like container within which products of the above mentioned character may be packaged under a condition of full or partial vacuum, whereby the air will be excluded from the package and the product therein and the package will be maintained vacuum-tight. It is also desirable to provide a method of packaging material in this manner and to provide a machine which operates at high speed to automatically fill, vacuumize, and vacuum seal products in a flexible vacuum-tight bag from which oxygen has been eliminated and which is sealed so that air or moisture cannot penetrate the walls of the container and thereafter contaminate the product sealed therein. It is the principal object of the present invention, therefore, to provide a machine for receiving flexible bag-like containers, thereafter opening, forming, and filling the same, then vacuumizing a plurality of filled containers at one time and maintaining them under a high degree of suction for a period of time, during which the packages will be successively vibrated to agitate the contents and to permit free exit of air from the mass of particles and from voids in the particles themselves, thereby insuring that while the containers are individually and successively sealed under vacuum they will be maintained in an environment of negative air pressure for a prolonged period so that the air will be thoroughly removed from the product, after which the flexible containers will be vacuum sealed and finally packaged in a manner to maintain the product within a vacuum-tight flexible bag.

It is a further object of the present invention to provide means for handling, measuring and introducing dry finely divided solids into a package in measured quantities in a manner to insure that the material will flow directly into the package without accumulating on the walls of the conduit or measuring valve and without the use of complicated valve mechanism and operating means therefor.

The invention contemplates the provision of a packaging machine formed with a continuous conveyor intermittently moving and having a bag receiving and forming station and a filling station, after which the filled containers pass through and along a tunnel within which a vacuum condition is created and where the containers are sealed to maintain a vacuum condition therein.

The invention is illustrated by way of example in the accompanying drawings in which:

Figure 1 is a view in horizontal section showing the machine with which the present invention is concerned with the cover plate of the vacuum chamber removed, so that the endless conveyors may be observed.

Fig. 2 is a view in vertical section and side elevation showing the complete machine, as seen on the line 2—2 of Fig. 1.

Fig. 3 is a view in end elevation showing the complete machine.

Fig. 4 is a fragmentary view in plan showing

Fig. 5 is a fragmentary view in side elevation showing the parts of the conveyor housing disclosed in Fig. 4.

Fig. 6 is a fragmentary view in plan showing the bag magazine.

Fig. 7 is a view in front elevation showing the bag magazine, the forming element, and the chute from which it is discharged.

Fig. 8 is a view in side elevation showing the elements of Fig. 7.

Fig. 9 is a fragmentary view in vertical section showing the mechanism by which an opened bag is placed within a pocket of the endless conveyor.

Fig. 10 is a fragmentary view in plan showing the location of one form of the feed hopper.

Figure 11:
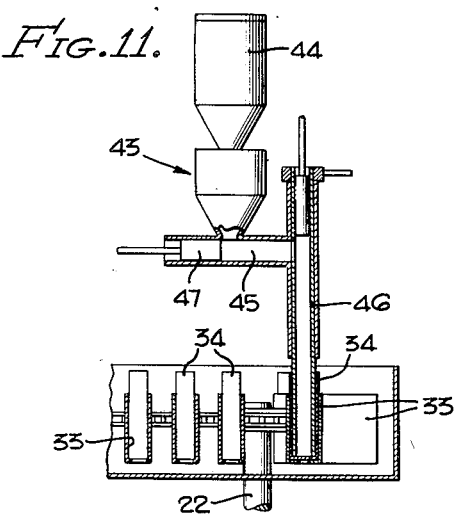
Fig. 11 is a view in vertical section and elevation showing the feed hopper and conveyor as seen in Fig. 10.

Referring more particularly to the drawings, 10 and 11 indicate complementary units of a vacuum packaging machine of the type with which the present invention is concerned. The units are duplicates and are intended to be operated intermittently and alternately since during the filling operation in each unit it is necessary to open the vacuum chamber in order to introduce filled and unsealed packages. Since the units 10 and 11 are identical, reference numerals applied to one unit will be equally applicable to the other. The units include a vacuum chamber 12 supported at a convenient level above the floor by legs 13. The vacuum chamber has opposite vertical side walls 14 and 15 and top and bottom walls 16 and 17. These walls are preferably welded together at their joints in order to form a vacuum-tight container within which a plurality of packages may be subjected to a suction action and sealed after having had the air evacuated from them.

One end of the vacuum chamber 12 is closed by an end plate 18. The other end may be opened and closed by a swinging end section 19. The swinging end section is box-like and is fitted with a gasket 20 so that when the end section is closed the chamber 12 will be vacuum-tight. It is to be understood that the end section 19 is provided to permit containers to be formed and filled exteriorly of the vacuum chamber and to thereafter be carried to vacuumizing and sealing stations within the chamber after the end 19 has been closed. Extending upwardly through the floor 17 of the vacuum chamber units and adjacent to opposite ends thereof are sprocket shafts 21 and 22. The shafts are driven from the drive shaft 23 through a suitable intermediate gear structure comprising drive and driven elements 24 and 25 respectively. The shaft 23 is here shown as being fitted with a sprocket 26 over which a sprocket chain 27 is led. This chain also passes over a sprocket 28 mounted upon the shaft of the driving motor 29. Since the shafts 21 and 22 are vertical and parallel they may receive sprockets 30 and 31 which are disposed in a common horizontal plane and around which an endless sprocket chain 32 passes. The sprocket or conveyor chain 32 carries a plurality of conveyor molds or pockets 33 which extend horizontally from the outermost edge of the conveyor chain so that as the chain travels the molds will move around the outer edge of the sprockets and will assume separated radial positions so that access to the molds may be easily had for purposes to be hereinafter explained. The molds, as particularly shown in Figs. 11, 12 and 13 of the drawings, are box-like structures into the upper open ends of which a bag-like container 34 is positioned. This container is of the general character shown in my issued Patent No. 2,102,716, dated December 21, 1937, and is made of sheet material which is flexible in character and is capable of preserving the product in a vacuum-tight condition when the container is sealed.

As originally placed in the machine the blanks from which the containers 34 are shaped lie flat. That is to say a sheet of material has been previously folded upon itself and has been joined together along opposite marginal side lines to form an envelope-like structure, after which a plurality of these units have been placed in a magazine 35. This magazine, as shown particularly in Fig. 8 of the drawings, has a downwardly inclined floor 36 upon which the blanks rest with their mouths presented upwardly. Guide plates 35' are disposed at opposite sides of the blanks and thus form the magazine within which a plurality of blanks may be placed. A weight 37 is disposed in the rear of the blanks and tends to force the blanks downwardly and toward the open end of the magazine. Fingers 38 are mounted at the top of the discharge end of the magazine and temporarily hold the blanks in the magazine. Mounted at the discharge end of the magazine is a vertically movable support 39 which carries vacuum cups 40. The vacuum cups are designed to press against the outer surface of the outermost package blank 34 and to pull the outer wall of the blank away from the inner wall of the blank, which is still engaged by the fingers 38. Mounted to move downwardly beteen the fingers 38 is a bag opening and forming unit 41 which reciprocates vertically and has a lower end which enters the opened mouth of the blank 34 as it moves downwardly. This forming unit and its operating mechanism is particularly disclosed in my co-pending application Serial No. 519,372, entitled "Method and Means of Vacuum Sealing Flexible Packages," filed January 22, 1944, now Patent 2,449,272. The downwardly moving opening and forming unit strips the outermost blank 34 from the supply of blanks within the magazine 35 and carries it downwardly between guide plates 42 which have a discharge end directly over the path of travel of the molds 33. The conveyor chain 32 moves intermittently so that the molds 33 move successively to a point of register with the guide plates 42 to allow the bag opening and forming unit 41 to carry the bag 34 down and to a position as shown in Fig. 9 of the drawings. The bag will thus be opened and formed as it is pressed into the mold.

Disposed at a point adjacent to the inserting station for the bags 34 is a filling station 43. At this station a hopper 44 for material intended to be packaged is stored. It is understood that this material may be a finely divided product such as powdered milk, coffee, or the like. A measuring chamber 45 is shown in Fig. 10 as being associated with the hopper so that a predetermined quantity of material from the hopper 44 may flow downwardly and may be ejected into a vertically disposed filling tube 46 by a reciprocating piston 47. The intermittent drive for the conveyor chain 32 is such as to insure that when the chain comes to rest a mold 33 will be disposed below and in register with the filling tube 46, thus allowing the material discharged into the tube 46 from the measuring compartment 44 to pass into the bag 34.

Figure 19:
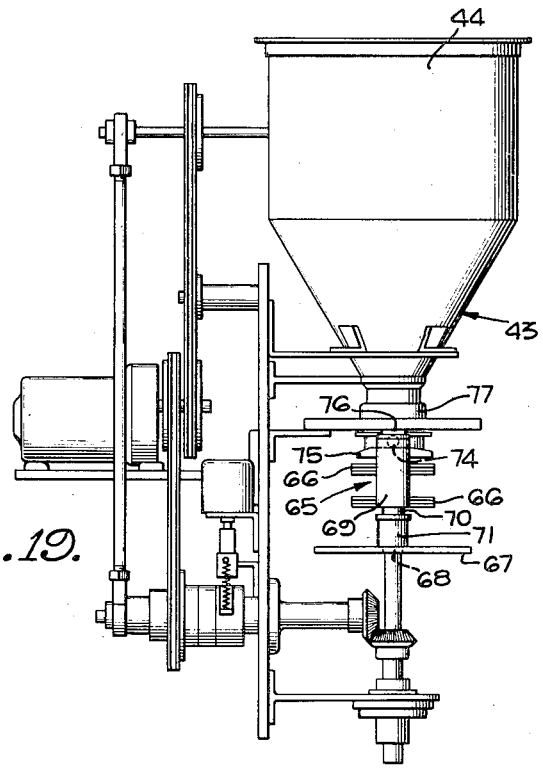
Fig. 19 is a view in elevation showing another form of the filling device.
Figure 20:
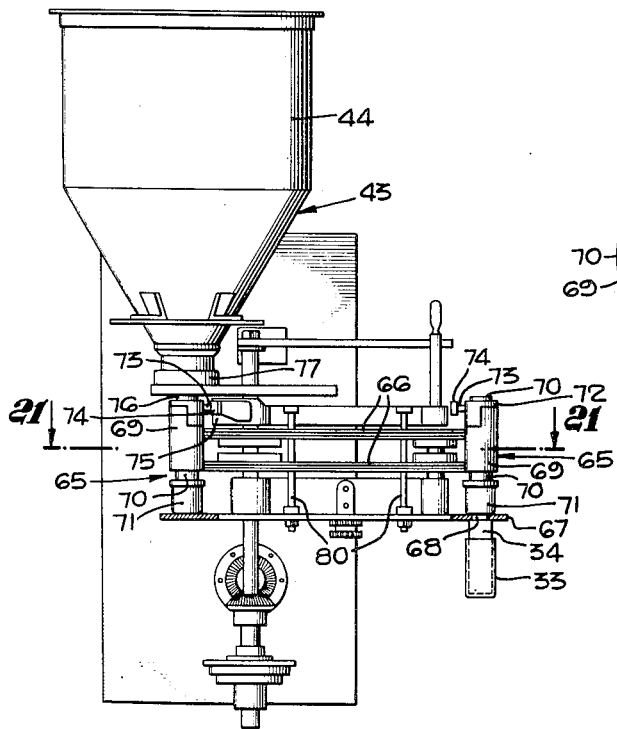
Fig. 20 is a view in end elevation showing the filling device.
Figure 21:
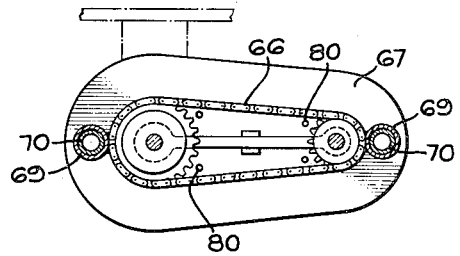
Fig. 21 is a view in horizontal section as seen on the line 21—21 of Fig. 20, showing the travel of the filling members.

Another form of measuring and filling device is shown in Figs. 19 to 21 in the drawings and will be described hereinafter.

Figure 12:
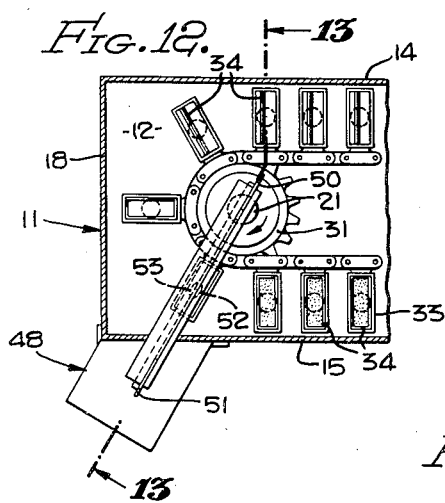
Fig. 12 is a fragmentary view in plan showing the bag creasing unit.
Figure 13:
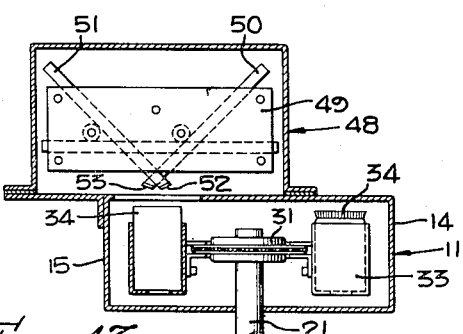
Fig. 13 is a fragmentary view in section taken on line 13—13 of Fig. 12 and showing the bag creasing unit.

The space horizontally between the sprockets 30 and 31 for the conveyor chains is sufficient to cause a relatively long run of conveyor chain 32 to occur between the sprockets. This allows a plurality of filled packages to travel within the vacuum chamber 12 and to allow the packages and their contents to be successively subjected to suction action as the filled packages travel to a creasing station 48. This station is disposed adjacent to the permanently closed end 18 of the vacuum chamber and is provided, as shown in Figs. 12 and 13 of the drawings, with a supporting plate 49 carrying a pair of spreading bars 50 and 51. These bars extend downwardly at angles to each other and are formed with end fingers 52 and 53 which enter the open mouth of the filled bag 34. The construction and operation of this particular creasing device is shown in my issued patent entitled "Method of Sealing Containers," No. 2,277,288, dated March 24, 1942.

Figure 14:
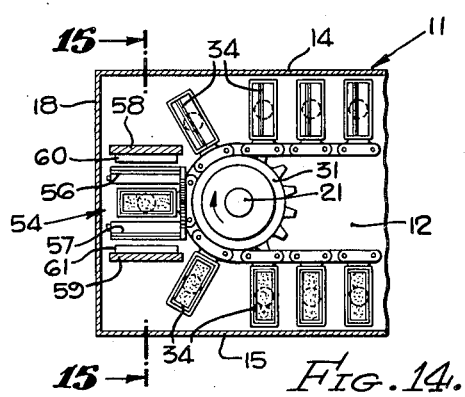
Fig. 14 is a fragmentary view in plan showing parts of the bag sealing station.
Figure 15:
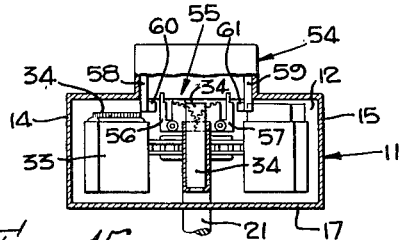
Fig. 15 is a fragmentary view in vertical section as seen on the line 15—15 of Fig. 14 showing a bag at the sealing station prior to the sealing operation.
Figure 16:
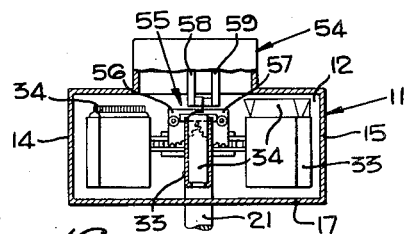
Fig. 16 is a view of the parts shown in Fig. 15 with the bag being sealed.

At a point in the travel of the molds 33 as they pass around the sprocket 31 is a sealing station 54. At this station a vertically reciprocating head 55 is provided, as shown in Figs. 14, 15 and 16. This head carries a pair of folding fingers 56 and 57, which act to draw the creased walls of the mouth of the container 34 together over the top of the material within the package and above the mouth of the mold 33. It is to be understood that the package has been formed with a coating of thermoplastic material on the inner face of at least one of its walls so that the package may be finaly heat sealed by the application of heat and pressure. The height of the package blank is such as to insure that after the walls have been folded down, as indicated in Fig. 16 of the drawings, arms 58 and 59 may move toward each other to apply heat and pressure to the abutting wall faces. The arm 58 carries a sealing bar 60 and the arm 50 carries a sealing pad 61. When these arms move from the position shown in Fig. 15 to the position shown in Fig. 16 the bar and pad will be clamped against the extending portion of the mouth of the package, and since the bar 60 carries a heating element it will be evident that the mouth of the package will be heat sealed. The sealing operation is accomplished during a period when the vacuum chamber 12 is subjected to suction action and while the member 19 closes the end of the vacuum chamber. Thus, the air will be drawn from the package at the time it is sealed and will be drawn from within the mold and around the package.

At successive intervals of movement of the sprocket chain 32 the molds 33 carrying sealed packages will be carried toward the end of the vacuum chamber 12 which is closed by the member 19. This action continues until the sealed packages reach an expelling station 62, at which time an expelling rod 63 will move upwardly striking the bottom of the mold 33 in register therewith and knocking the sealed package upwardly and out of the mold onto a receiving plate 64, by which plate the package is directed to a suitable conveyor chute or a receiving container.

Referring particularly to the form of the invention shown in Figs. 19 to 21 of the drawings, it will be seen that the material hopper 44 feeds directly into measuring tubes 65. The measuring tubes 65 are disposed vertically and are carried upon a horizontally moving conveyor chain 66. In this particular form of the invention the filling station is offset from the path of travel of the molds 33 carried on the conveyor chain. This path of travel, however, extends beneath a plate 67 having an opening at 68 which is above and registers with the path of travel of the molds 33. When therefore one of the measuring tubes 65 registers with the opening 68 the material within the tube will fall into the open mouth of a package 34 carried by a mold 33. This type of filling and measuring device is of special advantage when the material being placed within the packages is exceedingly fine and dry, such as would be the case with powdered milk. When handling this type of material it is necessary to maintain the powder in a loose and unpacked state within the hopper as well as within the measuring tubes 65 so that it will flow freely and so that it can be measured accurately. In order to accomplish this result the measuring tubes 65 are of special construction. They include an outer sleeve 69 through which a tube 70 may reciprocate vertically. Mounted for free reciprocation at the lower end of the tube 70 is a thimble 71 which slides vertically upon the tube 70 and rests at its lower end upon the upper surface of the plate 67. The upper end of the tube 70 carries a collar 72 which is fixed to move with it. A pin 73 extends from this collar and carries a cam roller 74. The cam roller engages a cam 75 disposed in the path of travel of the cam rollers and disposed adjacent to the discharge nozzle 76 of the hopper 44 so that the upper end of the tube may be lifted into register with the hopper when a discharge valve 77 opens and permits the material from the hopper to pass by gravity down into the tube 70 and its thimble 71.

In operation of the machine here disclosed and in carrying out the method with which the present invention is involved, conduits 78 are attached to suitable suction means having a valve mechanism 79 in the line thereof, the valve mechanism being controlled intermittently with the drive for the conveyor chains 32 so that suction will be imposed upon the vacuum chambers 12 during the time the closure 19 is closed at the end of the vacuum chambers. It should be explained that since it is necessary to open the end of the vacuum chambers 12 during the time the bags 34 are placed in the molds 33 and are thereafter filled it is desirable that a plurality of bags shall be placed in molds and filled at each time the closure 19 is swung open. This insures a fast operation of the machine. When the closure 19 is swung open the ends of the vacuum chambers 12 are opened from a line extending transversely through the vertical axis of the shaft 21 so that the bag opening and forming unit may deliver a bag from the magazine 35 to a mold 33, and so that the bag may thereafter be filled when it is moved to the filling station. The opening and forming operation, as previously explained, takes place when the supporting bar 39 and the vacuum cups 40 move outwardly from the end of the magazine 35 and pull the outer wall of the package blank outwardly to open the mouth of the blank. After this takes place the bag opening and forming unit 41 moves downwardly and passes into the open mouth of the bag which is partially supported by the magazine 35 and partially supported by the action of the vacuum cups 40. As the bag opening and forming unit 41 continues downwardly it will force the bag between the members 42 which will tend to shape the sides of the bag and will offer sufficient resistance to the downward movement of the opening and forming unit 41 so that the end will be squared. This will cause two triangular tabs to extend outwardly at opposite sides of the bag. These tabs are engaged by yieldably held rollers 42' which fold the triangular tabs upwardly against the sides of the bag so that as the opening and forming unit 41 continues down into the mold 33 the tabs will fold up against the sides of the bag as the bag is forced to the bottom of the mold, and will thus be held. It is to be understood that the height of the container 34 is a desired distance greater than the height of a pocket within the mold 33 so that the free edges of the mouth of the bag may be sealed subsequently.

After a bag 34 has been formed and placed within a mold 33 the opening and forming unit 41 is retracted from the position shown in Fig. 9 to the position shown in Fig. 7. The conveyor chain 32 is then moved to bring another empty mold in register with the path of travel of the bag opening and forming unit 41 and the subsequently formed bag is moved to the filling station, where a filling unit of the type shown in Fig. 11 or of the type shown in Figs. 19 to 21 is used. In either event a measured quantity of material is allowed to fall freely into the bag. In the structure shown in Fig. 20 it will be seen that adjusting screws 80 support the plate 67. By varying the height of the plate it will be seen that the effective length of the tube 70 and the sleeve 71 may be changed so that the amount of material fed into the package 34 will agree with the space provided for it in the package.

After a desired number of bags 34 have been formed and filled the end member 19 is closed. It is desirable that the molds 33 of substantially one-half the length of the conveyor chain shall be filled while the end member 19 of the vacuum chamber is opened, and that after the vacuum chamber has been closed this group of packages will be subjected continuously to vacuum action while the packages of the group are successively sealed. After the chamber has been sealed the valve 79 may be opened to allow the vacuum chamber to be subjected to suction by the suction pump connected to the conduit 78.

Figure 17:
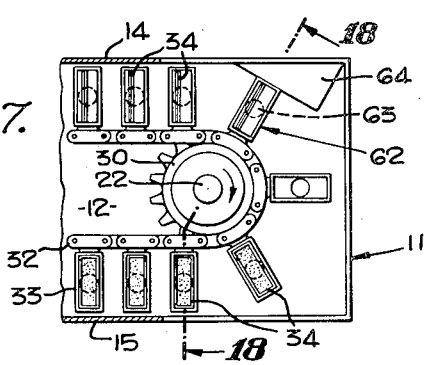
Fig. 17 is a fragmentary view in plan showing the discharge station of the endless conveyor.
Figure 18:
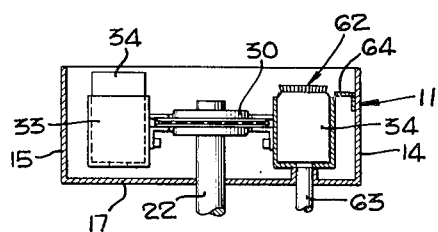
Fig. 18 is a fragmentary sectional view taken on line 18—18 in Fig. 17, and showing the bag expelling bar at the discharge station.

It will be recognized that while the vacuum chamber is closed and suction is applied the filled packages will move step by step to the creasing station 48 (Figs. 12 and 13) and the sealing station 54 (Figs. 14 and 15). At the creasing station 48 the members 50 and 51 will move downwardly and oppositely into the mouth of the bag 34 and the fingers 52 and 53 will stretch the mouth longitudinally while pulling the side walls of the bag together. This prepares the mouth of the bag for a closing operation at the sealing station, at which point the head 55 moves downwardly to position the folding fingers 56 and 57 at opposite sides of the creased and flattened mouth of the bag. When the folding fingers swing down to a position in a common plane across the end of the bag a portion of the flattened mouth of the bag will extend above the fingers. This portion is engaged between the sealing bar 60 and the sealing pad 61. The fingers then move together, as shown in Fig. 16, and the sealing operation takes place. During this sealing operation the vacuum chambers are under suction action so that the walls of the container will be subjected to suction within the container and around the container within the mold 33. After the container has been thus sealed it is moved progressively to the expelling station 62 (Figs. 17 and 18) where a rod 63 ejects the sealed package from its mold 33 and causes it to be thrown out onto a plate 64 by which it is led away from the machine. It is to be understood that the expelling station is at the end of the vacuum chamber which is opened by the member 19 so that the sealed packages are expelled while the vacuum seal of the chamber is broken and as the new packages are formed, placed in the molds, and filled.

In order to double the capacity of the machine the two units 10 and 11 are driven alternately. Thus, while a group of packages is being placed within molds and filled in one unit a group of packages in the other unit is enclosed within the vacuum chamber and is subjected to continuous vacuum action while the group of filled containers are successively sealed.

A suitable unit 95 is provided to continuously vibrate the conveyor chain and to thus agitate the material within the filled and unsealed packages so that the suction action will completely withdraw air from within and around the solid particles within which the container is filled.

It will thus be seen that the method and means of vacuum sealing packages here disclosed is relatively simple, and that it involves a method which insures that the packages may be rapidly opened, formed, filled, and sealed to retain a vacuum while the operation is carried on at high speed and with economy.

While I have shown the preferred method of vacuum packaging and the preferred apparatus for practising the method, it is to be understood that various changes may be made in the steps of the method and in the combination, construction and arrangement of the parts of the apparatus by those skilled in the art without departing from the spirit of the invention as claimed.

Having thus described my invention, what I claim and desire to secure by Letters Patent is:

1. A vacuum packaging machine comprising, a vacuum chamber, an endless conveyor chain therein, sprockets around which said chain is led, means intermittently driving said chain, a closure for said vacuum chamber through which packages may be introduced into said chamber and withdrawn therefrom, a plurality of package-receiving molds carried by said chain and adapted to receive open packages and the contents with which they are filled, means for intermittently opening said closure for the vacuum chamber to permit a plurality of filled packages to be placed within a series of package molds, means acting to fill said packages while said vacuum chamber is open, package sealing means within said vacuum chamber and adapted to close and seal the mouths of said packages while they are under vacuum action, means for connecting said vacuum chamber with suction apparatus, a valve for establishing and interrupting said connection, and synchronous drive means for the conveyor chain, the bag filling means, and the bag sealing means, whereby a package may be filled, vacuumized and sealed in a continuous sequence of operations.

2. A vacuum packaging machine comprising an elongated closed chamber, suction means connected therewith to create a partial vacuum therein, shafts through the floor of said chamber adjacent the opposite ends thereof, sprocket wheels, one on each shaft, said wheels lying in a common plane, an endless conveyor chain led around said sprocket wheels, a plurality of molds connected to said chain at spaced intervals therealong and adapted to receive a package to be filled and vacuum sealed, a closure at one end of said closed chamber through which packages may be introduced into the chamber and positioned in the molds connected to the conveyor chain and through which the sealed and vacuumized packages may be expelled, means for introducing and setting up a package blank within a mold while said closure is open, means for filling said package blank, means at the opposite end of the vacuum chamber for sealing the mouth of said package, said sealing means being enclosed within the vacuum chamber, and drive means associated with said endless conveyor whereby the endless conveyor, the package forming and filling means, and the package sealing means will move intermittently and in synchronism.

SAMUEL H. BERCH.

REFERENCES CITED

The following references are of record in the file of this patent:

UNITED STATES PATENTS

| Number | Name | Date |
|---|---|---|
| 1,061,384 | Knowlton | May 18, 1913 |
| 1,270,797 | Dunkley | July 2, 1918 |
| 1,386,887 | Malmquist | Aug. 9, 1921 |
| 1,825,200 | Patterson | Sept. 29, 1931 |
| 1,826,926 | Cundall | Oct. 13, 1931 |
| 2,064,678 | Morgan | Dec. 15, 1936 |
| 2,241,943 | Berch | May 31, 1941 |
| 2,277,288 | Berch | Mar. 24, 1942 |
| 2,281,187 | Waters | Apr. 28, 1942 |
| 2,292,295 | Royal | Aug. 4, 1942 |
| 2,380,903 | Ray | July 31, 1945 |